United States Patent Office 3,214,416
Patented Oct. 26, 1965

3,214,416
POLYMERS
Richard Waack, Framingham, Mass., assignor to The Dow Chemical Company, Midland, Mich., a corporation of Delaware
No Drawing. Filed Apr. 25, 1962, Ser. No. 189,978
15 Claims. (Cl. 260—78.4)

The present invention is directed to novel polystyrene polymers, and more particularly to modified polystyrenes containing reactive polar groups.

Polystyrene is used in large quantities for a variety of industrial uses. Many attempts have been made to substitute reactive and/or polar groups onto polystyrene to obtain a polystyrene with modified and/or entirely new properties.

It is an object of my invention to provide novel polystyrene polymers. It is also an object of my invention to provide a process for preparing novel polystyrene polymers. It is a further object of my invention to provide polystyrene polymers containing reactive polar groups which may be further modified to produce novel useful polymers.

I have discovered a process for producing modified polystyrene polymers in which some of the phenyl groups are reacted with two molecules of maleic anhydride to form cyclic groups attached to the polymer chain which have the following structure:

Polystyrene chain

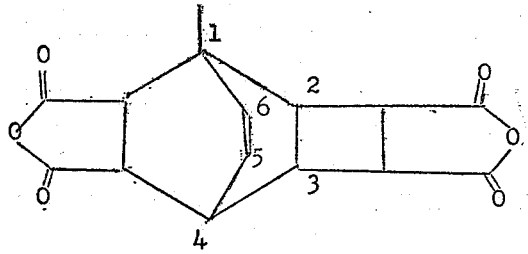

These groups may be described as dimaleic anhydride substituted cyclohexene groups. Between 0.1 and 10% and preferably between 1% and 5% of the phenyl groups originally in the polystyrene are converted to these cyclohexene groups.

The anhydride-containing groups may be reacted with cations or esterifying groups to form groups having the following structure:

Polystyrene chain

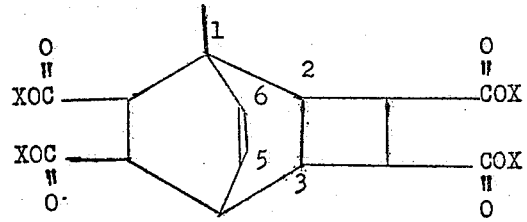

X is hydrogen or a salt-forming or esterifying group. These include metals such as sodium, potassium, calcium, barium, tin, zinc, and cadmium, and esterifying groups such as methyl, butyl, octyl, phenyl, stearyl, and oleyl. The preferred X groups are the noted metals and alkyls having up to 18 carbon atoms and monocyclic aryls. The carboxy radicals (HOOC—) are of the same order of reactivity and enter into the reactions generally known for this radical. Molecular cross-linked polymers are formed by using multi-functional salt-forming or esterifying reactants.

The anhydride-containing modified polymers are prepared by reacting polystyrene with maleic anhydride under ultra-violet radiation to prepare the substituted cyclohexene formed by the addition to the phenyl group of two maleic anhydride molecules. Ultra-violet radiation, preferably in the range of 1850 A. to about 4000 A. is used. The reaction is carried out in a non-participating solvent, such as tetrahydrofuran, carbon tetrachloride, cyclohexane, p-dioxane, 1,2-dichlorethane, etc. Neither pressure nor temperature is critical. The reaction time and the ratio of reactants affects the degree of substitution in the final polymer. The conversion to the cyclohexene units in this reaction is improved by adding with the reactants to the reaction mixture, photosensitizers such as benzophenone or equivalent photosensitizers which function as ultra-violet absorbers.

The anhydride-containing polymer may be hydrolyzed to form the acid or a salt. Esters may be formed by reaction of esterifying groups with the anhydride or with the acid. The anhydride and the acid may also be reacted with other compounds known to react with carboxy groups. Illustrative of these compounds are the amides, ethylene and/or propylene oxide glycols and similar difunctional groups, which result in cross-linking, and with isocyanates which also result in addition or cross-linked polymers. When the anhydride is hydrolyzed to produce free carboxy groups, the viscosity of the polymer solution and also the polymer's melt viscosity increased. This is believed due to association of the carboxy groups. This provides a physical association-crosslinking which can be overcome by heat but reforms on cooling, i.e., the polymer is thermoplastic in that it has a high softening point but is thermoset in having an energy barrier to flow or deformation at normal temperatures.

In order to provide a better understanding of the invention to those skilled in the art, the following illustrative examples are given:

Polystyrene which becomes clear at about 150° C. (softening point) and has a molecular weight of about 25,000 was used as the reactant in Examples 1-3. In Examples 4 and 5, the polystyrene reactant had a molecular weight of about 100,000. The polystyrene reactant of Examples 1-5 had a C-H analysis (percent by weight) of 92.3-7.6. The reactions were carried out in both Pyrex and quartz vessels. The ultra-violet source was a Hanovia high pressure, mercury-vapor quartz tube provided radiation from 1850 ° A. through to the visible. 2.5% polystyrene solutions containing ½ molar amounts of maleic anhydride based on styrene units were irradiated. The presence of maleic anhydride additions to the polymer were determined by infra-red analysis and polymer properties, such as viscosity, etc. The products of all the examples were recovered from the solutions and cast as films. The experimental data for Examples 1-5 is set forth in Table I.

TABLE I

| Ex. | Time, hrs. | Solvent | C-H analysis (percent) | I.R. data of cast films 5.6 | Polymer, Mol Wt. | Huggins K' |
|---|---|---|---|---|---|---|
| 1 | 23 | Tetrahydrofuran | 92.1–7.6 | Weak | | |
| 2 | 23 | Carbon tetrachloride | 90.9–7.3 | Moderate | | |
| 3 | 23 | Cyclohexane | 92.2–7.6 | do | | |
| 4 | 12 | p-Dioxane | 91.9–7.4 | Weak | $10 \times 10^4$ | 0.95 |
| 5 | 12 | Carbon tetrachloride | 87.9–7.3 *(2.6) | Moderate | $1.9 \times 10^4$ | 0.78 |

*Percent chlorine.

The maleic anhydride added to the polystyrene ranged from about 2 maleic anhydride units per 100 styrene units (Example 4) to 10 maleic anhydride units per 100 styrene units (Example 5). The modified polymers are benzene soluble.

Example 6

A benzene solution of the modified polymer product of Example 3 was refluxed with 10% aqueous NaOH. The product of this reaction is no longer soluble but only swells in benzene. It has a high ash content indicating salt formation. The maleic anhydride addition products were converted to the corresponding tetrasubstituted sodium salts. The alkali treated polymer remains in lump form to 250° C., whereas the untreated polymer becomes clear (softening point) at 150° C. This is indicative that the alkali treated material is cross-linked.

Example 7

The product of Example 5 was esterified with diazomethane by mixing an ether solution of diazomethane at 0–5° C. with the polymer in tetrahydrofuran and warmed to room temperature; evaporated to dryness and represented from methylethylketone in methyl alcohol to produce the tetramethyl ester.

Example 8

The product of Example 5 was hydrolyzed by refluxing in aqueous toluene to produce the tetracarboxy form of the dimaleic-anhydride substituted cyclohexane units.

The infra-red data; the solution (intrinsic) viscosity and the Huggins K' for the products of Examples 5, 7 and 8 are specified in Table II.

TABLE II

| Example | Infra-Red | Viscosity | K' |
|---|---|---|---|
| 5 | Anhydride—5.6μ | 0.29 | 0.78 |
| 7 | COOH dimer—3.3μ, broad carbonyl—5.85μ | 0.25 | 0.78 |
| 8 | Sharp carbonyl—5.75μ | 0.29 | 0.13 |

The carbonyl value at 5.85μ demonstrates that the COOH associates but not in ester form.

The physical and chemical properties of the modified polymer is dependent on the kind and degree of substitution. As noted hereinbefore the carboxy groups associate which results in desirable rheological and viscosity properties. Cold flow in fabricated polymers is minimized or may be entirely eliminated. As further illustrated hereinbefore, it is possible to introduce many functional groups by reaction with the carboxy functional groups, resulting in polymers useful as ion exchange resins, chelating agents, increased dyeabiliy with polar type dyes, etc. It is possible to introduce groups which impart desirable physical properties for fiber applications and also introduce groups useful in providing anti-static properties, germicidal properties, light stability, etc. Multi-functional groups reacted with carboxy groups result in cross-linked polymers having a wide variety of uses. Modified polystyrenes are also useful per se for many of the wide variety of commercial uses of polystyrene as well as for new uses based on its modified properties.

As many embodiments of this invention may be made without departing from the spirit and scope thereof, it is to be understood that the invention includes all such modifications and variations as come within the scope of the appended claims.

What is claimed is:

1. A modified polystyrene in which between 0.1 and 10% of the cyclic groups of the polymer have the following cyclohexene-containing structure:

Polystyrene chain

[structure diagram]

2. The modified polystyrene of claim 1 wherein between 1 and 5% of the cyclic groups have the cyclohexene-containing structure.

3. A modified polystyrene in which between 0.1 and 10% of the cyclic groups of the polymer have the following cyclohexene-containing structure:

Polystyrene chain

[structure diagram]

4. The modified polystyrene of claim 3 wherein between 1 and 5% of the cyclic groups have the cyclohexene-containing structure.

5. A modified polystyrene in which between 0.1 and 10% of the cyclic groups of the polymer have the following cyclohexene-containing structure:

Polystyrene chain

[structure diagram]

wherein X is selected from the class consisting of sodium, potassium, calcium, barium, tin, zinc, cadmium, alkyls having up to 18 carbon atoms in the chain and monocyclic aryls.

6. The modified polystyrene of claim 5 wherein between 1 and 5% of the cyclic groups have the cyclohexene-containing structure.

7. The process for preparing modified polystyrene comprising reacting, in solution, polystyrene and maleic anhydride in the presence of ultra-violet radiation to react the maleic anhydride with phenyl groups of the reactant polystyrene.

8. The process of claim 7 wherein the maleic anhydride is reacted with between 1 and 5% of the phenyl groups of the reactant polystyrene.

9. The process of claim 7 wherein the reaction product is hydrolyzed.

10. The process of claim 7 wherein the reaction mixture also contains benzophenone.

11. The process for preparing modified polystyrene comprising reacting polystyrene and maleic anhydride in a solvent selected from the class consisting of tetrahydrofuran, carbon tetrachloride, cyclo hexane, p-dioxane and 1,2-dichloroethane, in the presence of ultra-violet radiation having a wave length between 1850 A. and 4000 A., to react two molecules of maleic anhydride with each of between 0.1 and 10% of the phenyl groups of the reactant polystyrene.

12. The process of claim 11 wherein the maleic anhydride is reacted with between 1 and 5% of the phenyl groups of the reactant polystyrene.

13. The process of claim 11 wherein the reaction product is hydrolyzed.

14. The process of claim 11 wherein the reaction mixture also contains benzophenone.

15. The process of claim 12 wherein the reaction product is then hydrolyzed.

References Cited by the Examiner

UNITED STATES PATENTS 2,955,953   10/60   Graham _____ 204—154

OTHER REFERENCES

Angus and Bryce-Smith Proceedings of the Chemical Society, 1959, pp. 326–7.

Chemical & Engineering News, August 11, 1958, pp. 51 relied on.

JOSEPH L. SCHOFER, *Primary Examiner.*